United States Patent
Hirosawa et al.

(10) Patent No.: US 11,760,415 B2
(45) Date of Patent: Sep. 19, 2023

(54) MOVING BODY CONTROL APPARATUS, MOVING BODY, AND MOVING BODY CONTROL METHOD

(71) Applicant: HONDA MOTOR CO., LTD., Tokyo (JP)

(72) Inventors: Nozomu Hirosawa, Wako (JP); Chihiro Oguro, Wako (JP); Daichi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 17/199,957

(22) Filed: Mar. 12, 2021

(65) Prior Publication Data

US 2021/0284236 A1 Sep. 16, 2021

(30) Foreign Application Priority Data

Mar. 16, 2020 (JP) ................................. 2020-044951

(51) Int. Cl.
 *B62D 15/02* (2006.01)
(52) U.S. Cl.
 CPC ....... *B62D 15/0255* (2013.01); *B62D 15/026* (2013.01)
(58) Field of Classification Search
 CPC combination set(s) only.
 See application file for complete search history.

(56) References Cited

U.S. PATENT DOCUMENTS

| | | | | |
|---|---|---|---|---|
| 10,953,880 B2* | 3/2021 | Ma | | G05D 1/0214 |
| 11,167,795 B2* | 11/2021 | Kalabic | | B60W 60/0051 |
| 11,440,550 B2* | 9/2022 | Kato | | B60W 30/143 |
| 11,597,403 B2* | 3/2023 | Oh | | G08G 1/167 |
| 2014/0156133 A1* | 6/2014 | Cullinane | | B60K 37/06 701/23 |
| 2015/0314729 A1* | 11/2015 | Edgren | | G08B 6/00 340/438 |
| 2016/0280264 A1* | 9/2016 | Baek | | G01S 13/862 |
| 2018/0154939 A1* | 6/2018 | Aoki | | B62D 15/0255 |
| 2018/0239352 A1* | 8/2018 | Wang | | B60W 60/0053 |
| 2019/0061766 A1* | 2/2019 | Nishiguchi | | B60W 10/06 |
| 2019/0086917 A1* | 3/2019 | Okimoto | | B60W 40/08 |
| 2019/0094856 A1* | 3/2019 | Kawate | | B60W 50/082 |

(Continued)

FOREIGN PATENT DOCUMENTS

JP 6555067 B2 8/2019

*Primary Examiner* — Redhwan K Mawari
(74) *Attorney, Agent, or Firm* — Carrier, Shande & Associates P.C.; Joseph P. Carrier; Fulchand P. Shende (57) ABSTRACT

A moving body control apparatus includes a cancel control section performing control to cancel a lane change when a first cancel condition and a second cancel condition for cancelling the lane change are satisfied. When the first cancel condition is satisfied with the grip of an occupant on a manipulator being a prescribed level or greater, if a distance in a vehicle width direction between a moving body and a lane marker is a first distance threshold value or greater, the cancel control section judges that the second cancel condition is satisfied and cancels the lane change, and when the first cancel condition is satisfied with the grip being less than the prescribed level, if the distance is not less than a second distance threshold value greater than the first distance threshold value, the cancel control section judges that the second cancel condition is satisfied and cancels the lane change.

11 Claims, 5 Drawing Sheets

(56) References Cited

U.S. PATENT DOCUMENTS

| | | | | |
|---|---|---|---|---|
| 2019/0126928 A1* | 5/2019 | Sakaguchi | ...... | B60W 30/18163 |
| 2019/0263412 A1* | 8/2019 | Saikyo | ............ | B60W 30/18163 |
| 2021/0276558 A1* | 9/2021 | Oguro | ................... | B60W 50/10 |
| 2021/0276560 A1* | 9/2021 | Hirosawa | .............. | B60W 40/09 |
| 2021/0284166 A1* | 9/2021 | Oguro | ................... | B60W 50/14 |
| 2021/0284167 A1* | 9/2021 | Hirosawa | ........ | B60W 30/18163 |
| 2021/0284236 A1* | 9/2021 | Hirosawa | ........... | B62D 15/0255 |
| 2022/0126824 A1* | 4/2022 | Kato | .................... | B60W 10/20 |
| 2022/0315001 A1* | 10/2022 | Hirosawa | ........ | B60W 30/18163 |

* cited by examiner

MOVING BODY CONTROL APPARATUS, MOVING BODY, AND MOVING BODY CONTROL METHOD

CROSS-REFERENCE TO RELATED APPLICATION

This application is based upon and claims the benefit of priority from Japanese Patent Application No. 2020-044951 filed on Mar. 16, 2020, the contents of which are incorporated herein by reference.

BACKGROUND OF THE INVENTION

Field of the Invention

The present invention relates to a moving body control apparatus, a moving body, and a moving body control method.

Description of the Related Art

Japanese Patent No. 6555067 discloses a lane change assistance apparatus that causes a user vehicle to make a lane change from its own lane to an adjacent lane, according to a judgment result of a lane change possibility judging section.

SUMMARY OF THE INVENTION

However, in Japanese Patent No. 6555067, it is not always possible to accurately cancel a lane change.

The present invention has the objective of providing a moving body control apparatus, a moving body, and a moving body control method that make it possible to accurately cancel a lane change.

A moving body control apparatus according to one aspect of the present invention is a moving body control apparatus comprising a vicinity information acquiring section that acquires vicinity information of a moving body; a travel control section that controls travel of the moving body based on the vicinity information; a lane change control section that controls a lane change of the moving body; a cancel control section that performs control to cancel the lane change when a first cancel condition and a second cancel condition for cancelling the lane change are satisfied; and a grip judging section that judges a state of a grip of an occupant of the moving body on a manipulator configured to steer the moving body, wherein, when the first cancel condition is satisfied in a state where the grip of the occupant on the manipulator is judged to be greater than or equal to a prescribed level, if a distance in a vehicle width direction between the moving body and a lane marker, which is positioned between a first lane in which the moving body is travelling and a second lane adjacent to the first lane, is greater than or equal to a first distance threshold value, the cancel control section causes the moving body control apparatus to judge that the second cancel condition is satisfied and to cancel the lane change of the moving body from the first lane to the second lane, and if the distance in the vehicle width direction between the moving body and the lane marker is less than the first distance threshold value, the cancel control section causes the moving body control apparatus to judge that the second cancel condition is not satisfied and to perform the lane change of the moving body from the first lane to the second lane, and when the first cancel condition is satisfied in a state where the grip of the occupant on the manipulator is judged to be less than the prescribed level, if the distance in the vehicle width direction between the moving body and the lane marker is greater than or equal to a second distance threshold value, which is greater than the first distance threshold value, the cancel control section causes the moving body control apparatus to judge that the second cancel condition is satisfied and to cancel the lane change of the moving body from the first lane to the second lane, and if the distance in the vehicle width direction between the moving body and the lane marker is less than the second distance threshold value, the cancel control section causes the moving body control apparatus to judge that the second cancel condition is not satisfied and to perform the lane change of the moving body from the first lane to the second lane.

A moving body according to another aspect of the present invention includes the moving body control apparatus such as described above.

A moving body control method according to yet another aspect of the present invention comprises a lane change control step of controlling a lane change of a moving body based on vicinity information of the moving body; a cancellation control step of performing control to cancel the lane change when a first cancel condition and a second cancel condition for cancelling the lane change are satisfied; and a grip judging step of judging a state of a grip of an occupant of the moving body on a manipulator configured to steer the moving body, wherein, in the cancellation control step, when the first cancel condition is satisfied in a state where it is judged in the grip judging step that the grip of the occupant on the manipulator is greater than or equal to a prescribed level, if a distance in a vehicle width direction between the moving body and a lane marker, which is positioned between a first lane in which the moving body is travelling and a second lane adjacent to the first lane, is greater than or equal to a first distance threshold value, the second condition is judged to be satisfied and the lane change of the moving body from the first lane to the second lane is cancelled, and if the distance in the vehicle width direction between the moving body and the lane marker is less than the first distance threshold value, the second cancel condition is judged not to be satisfied and the lane change of the moving body from the first lane to the second lane is performed; and in the cancellation control step, when the first cancel condition is satisfied in a state where it is judged in the grip judging step that the grip of the occupant on the manipulator is less than the prescribed level, if the distance in the vehicle width direction between the moving body and the lane marker is greater than or equal to a second distance threshold value, which is greater than the first distance threshold value, the second condition is judged to be satisfied and the lane change of the moving body from the first lane to the second lane is cancelled, and if the distance in the vehicle width direction between the moving body and the lane marker is less than the second distance threshold value, the second cancel condition is judged not to be satisfied and the lane change of the moving body from the first lane to the second lane is performed.

According to the present invention, it is possible to provide a moving body control apparatus, a moving body, and a moving body control method that can accurately cancel a lane change.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Preferred embodiments of a moving body control apparatus, a moving body, and a moving body control method according to the present invention will be presented and described below with reference to the accompanying drawings.

Embodiment

Figure 1:
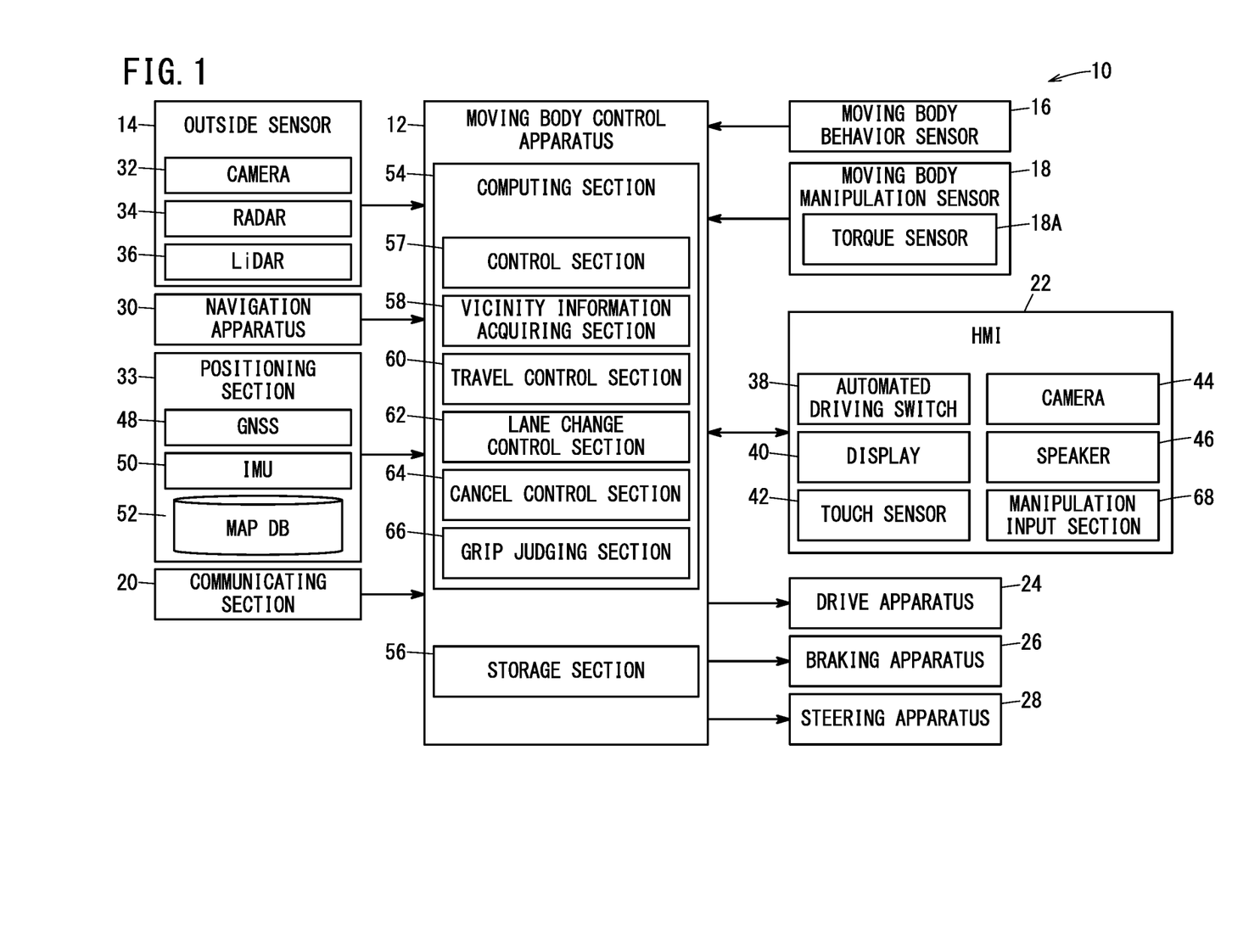
FIG. 1 is a block diagram showing a moving body including a moving body control apparatus according to an embodiment.
Figure 2:
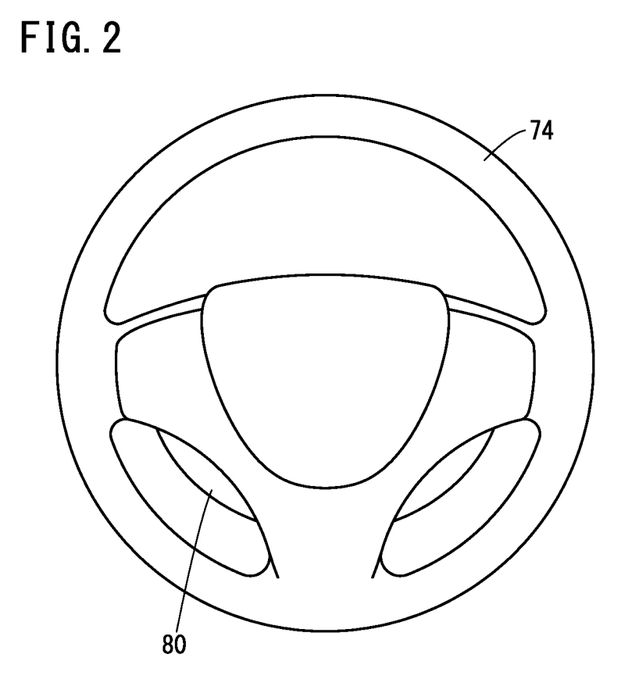
FIG. 2 is a diagram showing an example of a manipulator included in the moving body according to the embodiment.

A moving body control apparatus, a moving body, and a moving body control method according to an embodiment will be described using drawings. FIG. 1 is a block diagram showing a moving body that includes a moving body control apparatus according to the present embodiment. FIG. 2 is a diagram showing an example of a manipulator included in the moving body according to the present embodiment. Here, an example is described of a case in which a moving body 10 is a vehicle, but the moving body 10 is not limited to being a vehicle. For example, the moving body 10 may be a robot or the like.

The moving body 10 includes a moving body control apparatus 12, i.e. a moving body control ECU (Electronic Control Unit). The moving body 10 further includes an outside sensor 14, a moving body behavior sensor 16, a moving body manipulation sensor 18, a communicating section 20, and an HMI (Human-Machine Interface) 22. The moving body 10 also includes a drive apparatus 24, a braking apparatus 26, a steering apparatus 28, a navigation apparatus 30, and a positioning section 33. The moving body 10 includes configurational elements other than the above configurational elements, but descriptions thereof are omitted.

The outside sensor 14 acquires outside information, which is information concerning the area around the moving body 10. The outside sensor 14 includes a plurality of cameras 32 and a plurality of radars 34. The outside sensor 14 also includes a plurality of LiDARs (Light Detection And Ranging, Laser Imaging Detection And Ranging) 36.

The information acquired by the cameras (imaging section) 32, i.e. camera information, is supplied from the cameras 32 to the moving body control apparatus 12. The camera information is captured image information, for example. The camera information forms outside information, together with the radar information and LiDAR information described further below. In FIG. 1, only one camera 32 is shown, but a plurality of cameras 32 are actually included.

Each radar 34 emits a transmission wave toward the outside of the moving body 10, and receives a reflected wave that comes back to the radar 34 when a portion of the emitted transmission wave is reflected by a detection object. The transmission wave may be an electromagnetic wave or the like, for example. The electromagnetic wave is a millimeter wave or the like, for example. The detection object is another moving body 70 (see FIG. 3A) that is different from the moving body 10, i.e. another vehicle or the like. The radar 34 generates radar information (reflected wave signal) based on the reflected wave or the like. The radar 34 supplies the generated radar information to the moving body control apparatus 12. In FIG. 1, one radar 34 is shown, but a plurality of radars 34 are actually included in the moving body 10. The radars 34 are not limited to being millimeter wave radars. As an example, ultrasonic sensors or the like may be used as the radars 34.

Each LiDAR 36 continuously emits a laser in all directions from the moving body 10, measures the three-dimensional position of a reflection point based on reflected waves resulting from the emitted laser, and outputs information concerning this three-dimensional position, i.e. three-dimensional information. The LiDAR 36 supplies this three-dimensional information, i.e. LiDAR information, to the moving body control apparatus 12. In FIG. 1, one LiDAR 36 is shown, but a plurality of LiDARs 36 are actually included in the moving body 10.

The moving body behavior sensor 16 acquires information concerning the behavior of the moving body 10, i.e. moving body behavior information. The moving body behavior sensor 16 includes a velocity sensor (not shown in the drawings), a wheel velocity sensor (not shown in the drawings), an acceleration sensor (not shown in the drawings), and a yaw rate sensor (not shown in the drawings). The velocity sensor detects the velocity of the moving body 10, i.e. the vehicle velocity. Furthermore, the velocity sensor detects the progression direction of the moving body 10. The wheel velocity sensor detects the velocity of the vehicle wheels (not shown in the drawings), i.e. the wheel velocity. The acceleration sensor detects the acceleration of the moving body 10. The acceleration includes the forward-rear acceleration, the lateral acceleration, and the up-down acceleration. It is acceptable for acceleration in only some of these directions to be detected by the acceleration sensor. The yaw rate sensor detects the yaw rate of the moving body 10.

The moving body manipulation sensor (driving manipulation sensor) 18 acquires information concerning driving manipulations made by an occupant (driver), i.e. driving manipulation information. The moving body manipulation sensor 18 includes an acceleration pedal sensor (not shown in the drawings), a brake pedal sensor (not shown in the drawings), a steering angle sensor (not shown in the drawings), and a torque sensor (steering torque sensor) 18A. The acceleration pedal sensor detects the manipulation amount of an acceleration pedal (not shown in the drawings). The brake pedal sensor detects the manipulation amount of a brake pedal (not shown in the drawings). The steering angle sensor detects the steering angle of a manipulator 74 (see FIG. 2), i.e. a steering wheel. The torque sensor 18A detects the torque applied to the manipulator 74, i.e. the steering torque.

The communicating section 20 performs wireless communication with an external device (not shown in the drawings). The external device can include an external server or the like (not shown in the drawings), for example. The communicating section 20 may be capable or incapable of being attached to and detached from the moving body 10. Examples of the communicating section 20 that is capable of being attached to and detached from the moving body 10 include a mobile telephone, a smartphone, and the like.

The HMI 22 receives the manipulation input made by an occupant, and visually, audibly, or tactilely provides the user with various types of information. The HMI 22 includes an automated driving switch (driving assistance switch) 38, a display 40, a touch sensor 42, a camera 44, a speaker 46, and a manipulation input section 68.

The automated driving switch 38 is a switch with which the occupant issues instructions to start and stop automated driving. The automated driving switch 38 includes a start switch (not shown in the drawings) and a stop switch (not shown in the drawings). The start switch outputs a start signal to the moving body control apparatus 12, in response to a manipulation by the occupant. The stop switch outputs a stop signal to the moving body control apparatus 12, in response to a manipulation by the occupant.

The display (display section) 40 includes a liquid crystal display, organic EL display, or the like, for example. Here, an example is described of a case in which the display 40 is a touch panel, but the display 40 is not limited to this.

The touch sensor 42 can detect touching of the manipulator 74 by the occupant. A signal output from the touch sensor 42 is supplied to a grip judging section 66. The grip judging section 66 can determine the state of contact between the occupant and the manipulator 74, based on the signal supplied from the touch sensor 42.

The camera 44 captures an image of the inside of the moving body 10, i.e. the inside of the vehicle cabin (not shown in the drawings). Furthermore, the camera 44 can be provided to capture an image of the occupant. The camera 44 may be provided on the dashboard (not shown in the drawings) or on the ceiling (not shown in the drawings), for example. The camera 44 outputs information acquired by capturing the image inside the vehicle cabin, i.e. image information, to the moving body control apparatus 12.

The speaker 46 provides the occupant with various types of information using sound. The moving body control apparatus 12 outputs various notifications, warnings, and the like using the speaker 46.

The manipulation input section 68 enables the occupant to perform manipulation input to issue instructions for a lane change. Furthermore, in a case where a lane change proposal is made by the moving body control apparatus 12, the occupant can indicate whether they agree with this lane change proposal by using the manipulation input section 68. The manipulation input section 68 is a lever-shaped manipulator (not shown in the drawings) for example, but is not limited to this. The manipulation input section 68 is provided on a steering column 80 (see FIG. 2), for example, but is not limited to this. The manipulation input section 68 can pivot clockwise and counter-clockwise centered on a support shaft, for example. The manipulation input section 68 includes a manipulation position sensor (not shown in the drawings). The manipulation position sensor detects a manipulation position of the manipulation input section 68. The manipulation input section 68 supplies information acquired by the manipulation position sensor, i.e. information concerning the manipulation position of the manipulation input section 68, to the moving body control apparatus 12 described further below.

The drive apparatus (drive force control system) 24 includes a drive ECU (not shown in the drawings) and a drive source (not shown in the drawings). The drive ECU controls the drive force (torque) of the moving body 10 by controlling the drive source. The drive source can be an engine, a drive motor, or the like, for example. The drive ECU can control the drive force by controlling the drive source, based on manipulation of the acceleration pedal performed by the occupant. Furthermore, the drive ECU can control the drive force by controlling the drive source based on instructions supplied from the moving body control apparatus 12. The drive force of the drive source is transmitted to the vehicle wheels (not shown in the drawings) via a transmission or the like (not shown in the drawings).

The braking apparatus (braking force control system) 26 includes a braking ECU (not shown in the drawings) and a braking mechanism (not shown in the drawings). The braking mechanism causes a braking member to operate using a brake motor, hydraulic mechanism, or the like. The braking ECU can control the braking force by controlling the braking mechanism based on a manipulation of the brake pedal made by the occupant. Furthermore, the braking ECU can control the braking force by controlling the braking mechanism based on instructions supplied from the moving body control apparatus 12.

The steering apparatus (steering system) 28 includes a steering ECU (not shown in the drawings), i.e. an EPS (Electric Power Steering) system ECU, and a steering motor (not shown in the drawings). The steering ECU controls the orientation of the wheels (steered wheels) by controlling the steering motor based on a manipulation of the manipulator 74, i.e. the steering wheel, performed by the occupant. Furthermore, the steering ECU controls the orientation of the wheels by controlling the steering motor based on instructions supplied from the moving body control apparatus 12. The steering may be performed by changing the torque distribution and the braking force distribution among the left and right wheels.

The navigation apparatus 30 includes a GNSS (Global Navigation Satellite System) sensor (not shown in the drawings). Furthermore, the navigation apparatus 30 includes a computing section (not shown in the drawings) and a storage section (not shown in the drawings). The GNSS sensor detects the current position of the moving body 10. The computing section reads map information corresponding to the current position detected by the GNSS sensor, from a map database stored in the storage section. The computing section determines a target route from the current position to a destination, using this map information. The destination is input by the occupant via the HMI 22. As described above, the display 40 is a touch panel. The input of the destination is performed by having the occupant manipulate the touch panel. The navigation apparatus 30 outputs the created target route to the moving body control apparatus 12. The moving body control apparatus 12 supplies this target route to the HMI 22. The HMI 22 displays this target route in the display 40.

The positioning section 33 includes a GNSS 48. The positioning section 33 further includes an IMU (Inertial Measurement Unit) 50 and a map database (map DB) 52. The positioning section 33 identifies the position of the moving body 10 using information acquired by the GNSS 48, information acquired by the IMU 50, and the map information stored in the map database 52. The positioning section 33 can supply the moving body control apparatus 12 with self position information that is information indicating the position of the moving body 10, i.e. position information of the moving body 10. Furthermore, the positioning section 33 can supply the moving body control apparatus 12 with the map information.

The moving body control apparatus 12 includes a computing section 54 and a storage section 56. The computing section 54 performs overall control of the moving body control apparatus 12. The computing section 54 can be formed by one or more processors, for example. A CPU (Central Processing Unit) or the like can be used as these processors, for example. The computing section 54 performs the moving body control by controlling each section based on a program stored in the storage section 56.

The computing section 54 includes a control section 57, a vicinity information acquiring section 58, a travel control section 60, a lane change control section 62, a cancel control section 64, and the grip judging section 66. The control section 57, the vicinity information acquiring section 58, the travel control section 60, the lane change control section 62, the cancel control section 64, and the grip judging section 66 can be realized by having the computing section 54 execute a program stored in the storage section 56.

The storage section 56 includes a volatile memory (not shown in the drawings) and a non-volatile memory (not shown in the drawings). The volatile memory can be a RAM (Random Access Memory) or the like, for example. The non-volatile memory can be a ROM (Read Only Memory), a flash memory, or the like, for example. The outside information, the moving body behavior information, the moving body manipulation information, and the like are stored in the volatile memory, for example. Programs, tables, maps, and the like are stored in the non-volatile memory, for example.

The control section 57 performs overall control of the moving body control apparatus 12.

The vicinity information acquiring section 58 can acquire vicinity information of the moving body 10. This vicinity information can be supplied from the outside sensor 14, for example.

The travel control section 60 can control the travel of the moving body 10, based on the vicinity information acquired by the vicinity information acquiring section 58.

The lane change control section 62 can control lane changing of the moving body 10. For example, the lane change control section 62 can make a lane change proposal to the occupant and perform a lane change if this lane change proposal is accepted by the occupant, but the present invention is not limited to this. The lane change control section 62 may perform a lane change without making a lane change proposal to the occupant. Furthermore, a lane change may be made by the lane change control section 62 based on lane change instructions provided by the occupant. When a lane change is to be performed, the cancel control section 64 can provide the occupant with information indicating that a lane change will be performed, using the display 40, the speaker 46, and the like, for example.

The cancel control section 64 can perform control to cancel the lane change when a first cancel condition and a second cancel condition for cancelling the lane change are satisfied. The first cancel condition is a basic cancel condition. For example, the first cancel condition can be satisfied when another moving body 70 (see FIG. 3A) travelling in a second lane 72B (see FIG. 3A) described further below is approaching at a velocity greater than or equal to a prescribed velocity. Furthermore, the first cancel condition can be satisfied when there is a falling object in the second lane 72B. Yet further, the first cancel condition can be satisfied when there is a lane (not shown in the drawings) merging with the second lane 72B. The second cancel condition can be satisfied when a distance in a vehicle width direction between a lane marker 73 (see FIG. 3A) described further below and the moving body 10 is greater than or equal to a prescribed distance threshold value. When the lane change is to be cancelled, the cancel control section 64 can provide the occupant with information indicating that the lane change will be cancelled, using the display 40, the speaker 46, and the like.

The grip judging section 66 can judge the state of the grip of the occupant of the moving body 10 on the manipulator 74 for steering the moving body 10, i.e. the level of gripping. As described above, the grip judging section 66 can judge the gripping state of the occupant of the moving body 10 on the manipulator 74 based on the signal supplied from the touch sensor 42, for example. For example, the grip judging section 66 is capable of judging whether the manipulator 74 is being gripped by both hands of the occupant or whether the manipulator 74 is being gripped by just one hand of the occupant. Here, an example is described of a case in which the state of the grip of the occupant on the manipulator 74 is judged, but the present invention is not limited to this. The grip judging section 66 may judge whether or not the manipulator 74 is being gripped by the occupant.

Figure 3A:
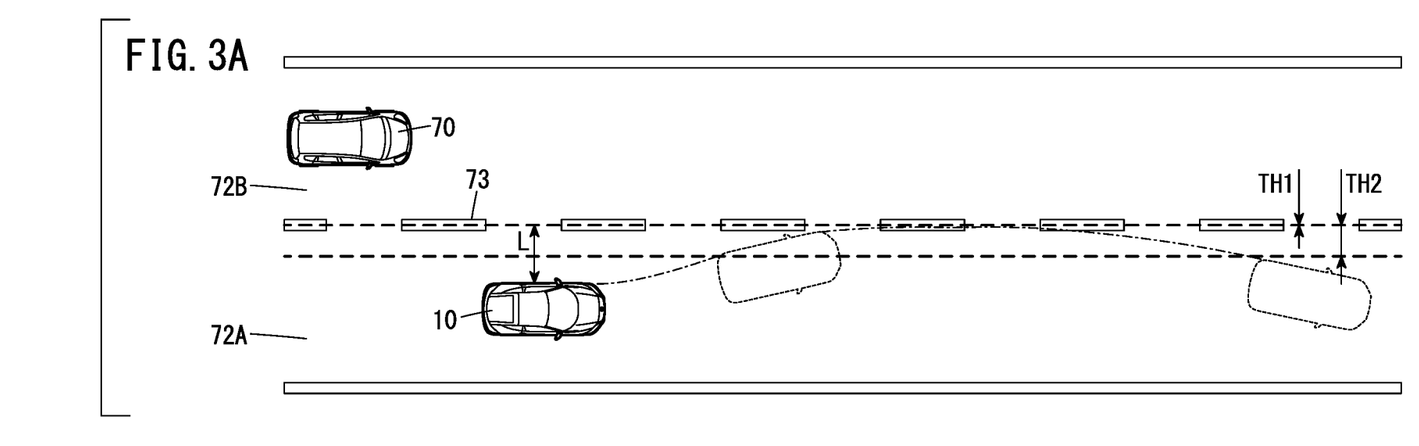
FIGS. 3A and 3B are diagrams showing examples of travel lanes.
Figure 3B:
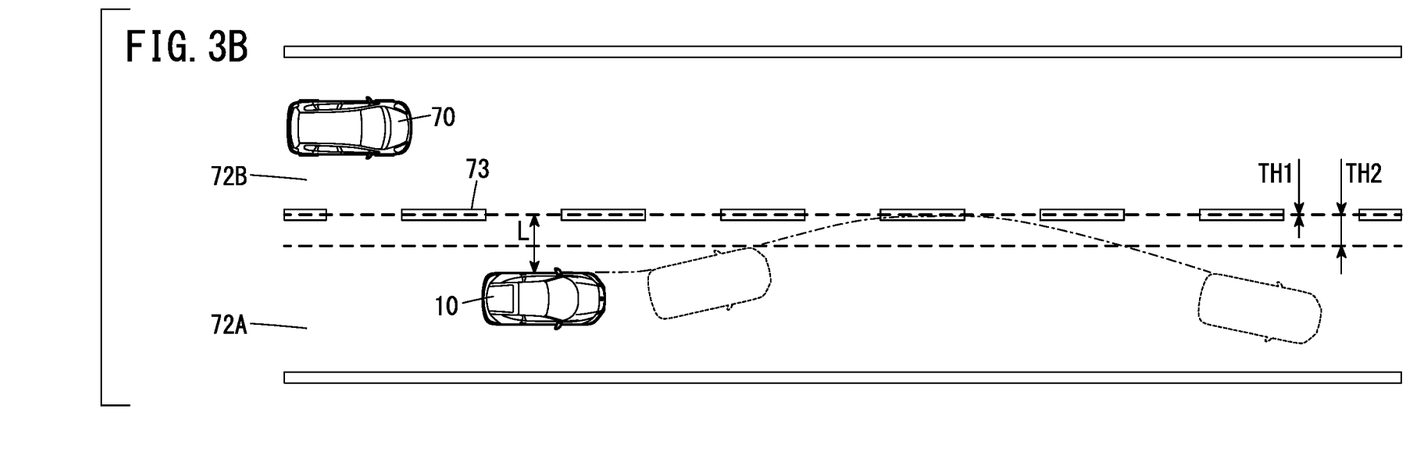

FIGS. 3A and 3B are diagrams showing examples of travel lanes. A first lane 72A and the second lane 72B, which is adjacent to the first lane 72A, are shown in FIGS. 3A and 3B. The lane marker 73 is present between the first lane 72A and the second lane 72B. An example of a case in which the moving body 10 is travelling in the first lane 72A is shown in FIGS. 3A and 3B. An example of a state in which the other moving body 70, which is positioned farther backward than the position of the moving body 10, is travelling in the second lane 72B is shown in FIGS. 3A and 3B. When describing the lanes in general, the reference numeral 72 is used, and when describing each lane individually, the reference numerals 72A and 72B are used. Here, an example is shown in which the first lane 72A is positioned on the right side relative to the progression direction and the second lane 72B is positioned on the left side relative to the progression direction, but instead, the first lane 72A may be positioned on the left side relative to the progression direction and the second lane 72B may be positioned on the right side relative to the progression direction.

When the moving body 10 is to perform a lane change from the first lane 72A to the second lane 72B, if the other moving body 70 travelling in the second lane 72B is approaching quickly from the rear, the first cancel condition can be satisfied. When the first cancel condition is satisfied in a state where the grip judging section 66 has judged that the grip of the occupant on the manipulator 74, i.e. the steering wheel, is greater than or equal to a prescribed level, the cancel control section 64 can perform control such as described below. Specifically, in such a case, as shown in FIG. 3A, the cancel control section 64 judges that the second cancel condition is satisfied if a distance L in the vehicle width direction between the lane marker 73 and the moving body 10 is greater than or equal to a first distance threshold value TH1. Since the first cancel condition and the second cancel condition are satisfied, the cancel control section 64 cancels the lane change of the moving body 10 from the first lane 72A to the second lane 72B. When the lane change is cancelled, the travel control section 60 controls the travel of the moving body 10 such that the moving body 10 travels along the center of the first lane 72A. The first distance threshold value TH1 is 0, for example, but is not limited to this. Furthermore, the distance L can be the distance between the lane marker 73 and the location on the moving body 10 closest to the lane marker 73, for example, but is not limited to this. When a portion of the moving body 10 overlaps with the lane marker 73 in a planar view, the distance L is less than 0, i.e. a negative value. When a wheel (not shown in the drawings) of the moving body 10 has crossed the lane marker 73, the distance L is less than 0, i.e. a negative value.

On the other hand, when the first cancel condition is satisfied in a state where the grip judging section 66 has judged that the grip of the occupant on the manipulator 74, i.e. the steering wheel, is less than the prescribed level, the cancel control section 64 can perform control such as described below. In this case, as shown in FIG. 3B, the cancel control section 64 judges that the second cancel condition is satisfied if the distance L in the vehicle width direction between the lane marker 73 and the moving body 10 is greater than or equal to a second distance threshold value TH2, which is greater than the first distance threshold value TH1. Since the first cancel condition and the second cancel condition are satisfied, the cancel control section 64 cancels the lane change of the moving body 10 from the first lane 72A to the second lane 72B. As described above, when the lane change is cancelled, the travel control section 60 controls the travel of the moving body 10 such that the moving body 10 travels along the center of the first lane 72A.

In this way, in the present embodiment, when the first cancel condition is satisfied in a state where the grip of the occupant on the manipulator 74 is greater than or equal to a prescribed level, the cancel control section 64 judges that the second cancel condition is satisfied if the distance L is greater than or equal to the first distance threshold value TH1. That is, in the present embodiment, when the first cancel condition is satisfied in a state where the grip of the occupant on the manipulator 74 is greater than or equal to the prescribed level, the cancel control section 64 judges that the second cancel condition is satisfied even when the distance L is relatively small. On the other hand, when the first cancel condition is satisfied in a state where the grip of the occupant on the manipulator 74 is less than the prescribed level, the cancel control section 64 judges that the second cancel condition is satisfied if the distance L is greater than or equal to the second distance threshold value TH2, which is greater than the first distance threshold value TH1. That is, when the first cancel condition is satisfied in a state where the grip of the occupant on the manipulator 74 is less than the prescribed level, the cancel control section 64 does not judge that the second cancel condition is satisfied unless the distance L is greater than a certain distance. The reason for changing the distance threshold value in this manner in the present embodiment is as follows. Specifically, in a state where the grip of the occupant on the manipulator 74 is greater than or equal to the prescribed level, the occupant can quickly perform the necessary countermeasures as needed when the lane change cancellation is communicated to the occupant from the moving body control apparatus 12. On the other hand, in a state where the grip of the occupant on the manipulator 74 is less than the prescribed level, the occupant cannot necessarily perform the necessary countermeasures quickly when the lane change cancellation is communicated to the occupant from the moving body control apparatus 12. Due to such reasons, in the present embodiment, when the first cancel condition is satisfied in a state where the grip of the occupant on the manipulator 74 is greater than or equal to the prescribed level, the cancel control section 64 cancels the lane change even when the distance L is relatively small. That is, when the first cancel condition is satisfied in a state where the grip of the occupant on the manipulator 74 is greater than or equal to the prescribed level, the cancel control section 64 judges that the second condition is satisfied and cancels the lane change if the distance L is greater than or equal to the first distance threshold value TH1.

When the first cancel condition is satisfied in a state where the distance L in the vehicle width direction between the moving body 10 and the lane marker 73 is greater than or equal to the first distance threshold value TH1 and less than the second distance threshold value TH2, the following occurs. Specifically, when the first cancel condition is satisfied in such a state and the grip judging section 66 judges that the grip of the occupant on the manipulator 74 is greater than or equal to the prescribed level, the cancel control section 64 can cancel the lane change of the moving body 10 from the first lane 72A to the second lane 72B.

The first distance threshold value TH1 may be variable according to the velocity of the moving body 10. Furthermore, the second distance threshold value TH2 may be variable according to the velocity of the moving body 10.

Figure 4:
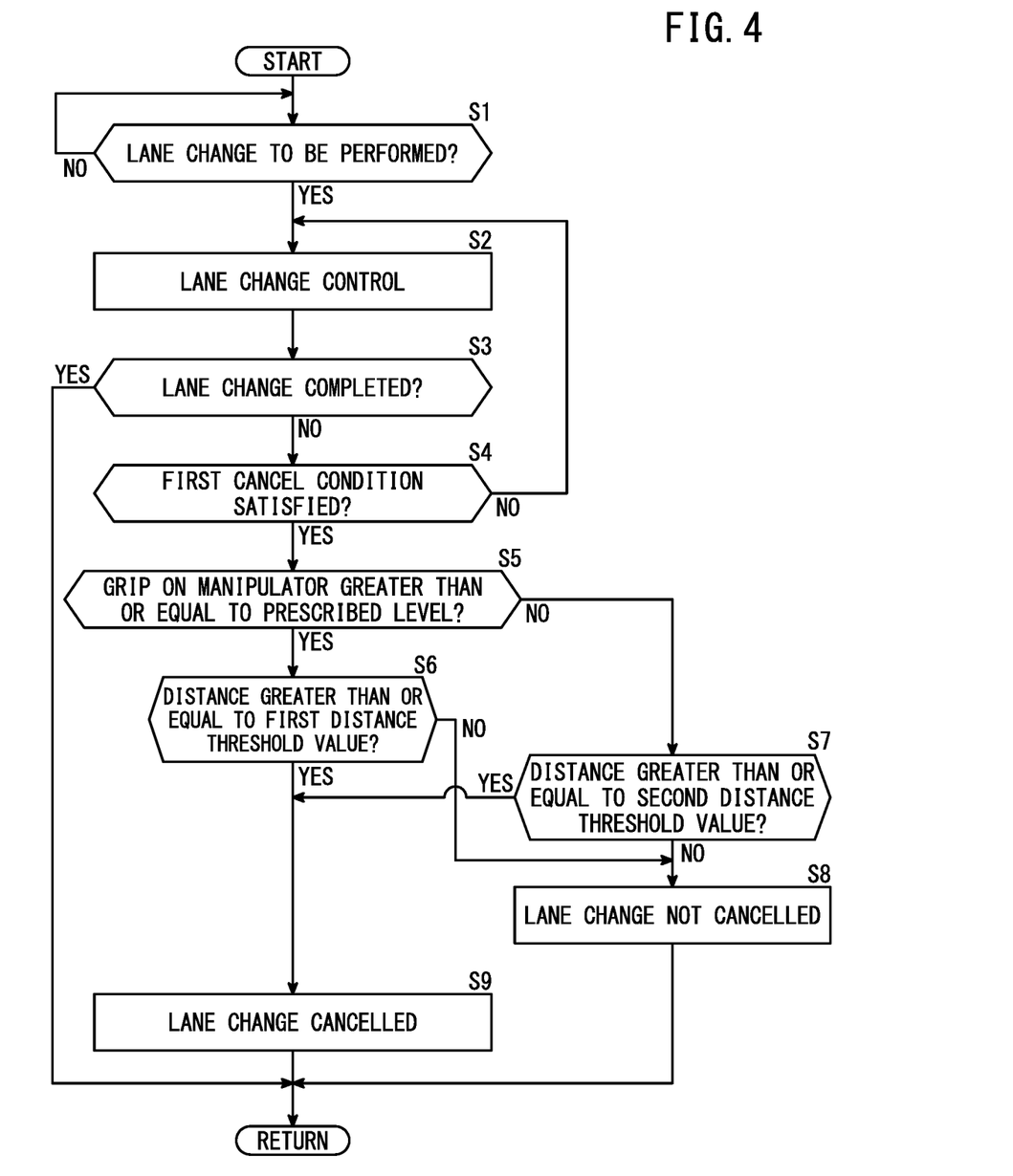
FIG. 4 is a flow chart showing an example of an operation of the moving body control apparatus according to the embodiment.

FIG. 4 is a flow chart showing an example of an operation of the moving body control apparatus according to the present embodiment. An operation performed when changing lanes is shown in FIG. 4.

At step S1, the control section 57 judges whether a lane change is to be performed. If a lane change is to be performed (YES at step S1), the process moves to step S2. If a lane change is not to be performed (NO at step S1), step S1 is repeated.

At step S2, the lane change control section 62 performs the lane change control. After this, the process moves to step S3.

At step S3, the control section 57 judges whether the lane change has been completed. If the lane change has been completed (YES at step S3), the process shown in FIG. 4 ends. If the lane change has not been completed, (NO at step S3), the process moves to step S4.

At step S4, the cancel control section 64 judges whether the first cancel condition is satisfied. If the first cancel condition is satisfied (YES at step S4), the process moves to step S5. If the first cancel condition is not satisfied (NO at step S4), the processing from step S2 onward is repeated.

At step S5, the grip judging section 66 judges whether the grip of the occupant on the manipulator 74 is greater than or equal to the prescribed level. If the grip of the occupant on the manipulator 74 is greater than or equal to the prescribed level (YES at step S5), the process moves to step S6. If the grip of the occupant on the manipulator 74 is less than the prescribed level (NO at step S5), the process moves to step S7.

At step S6, the cancel control section 64 judges whether the distance L in the vehicle width direction between the lane marker 73 and the moving body 10 is greater than or equal to the first distance threshold value TH1. If the distance L in the vehicle width direction between the lane marker 73 and the moving body 10 is greater than or equal to the first distance threshold value TH1 (YES at step S6), the process moves to step S9. If the distance L in the vehicle width direction between the lane marker 73 and the moving body 10 is less than the first distance threshold value TH1 (NO at step S6), the process moves to step S8.

At step S7, the cancel control section 64 judges whether the distance L in the vehicle width direction between the lane marker 73 and the moving body 10 is greater than or equal to the second distance threshold value TH2. If the distance L in the vehicle width direction between the lane marker 73 and the moving body 10 is greater than or equal to the second distance threshold value TH2 (YES at step S7), the process moves to step S9. If the distance L in the vehicle width direction between the lane marker 73 and the moving body 10 is less than the second distance threshold value TH2 (NO at step S7), the process moves to step S8.

At step S8, the cancel control section 64 judges that the second cancel condition is not satisfied, and does not cancel the lane change of the moving body 10 from the first lane 72A to the second lane 72B. In this case, the lane change control is performed by the lane change control section 62 until the lane change of the moving body 10 from the first lane 72A to the second lane 72B is completed.

At step S9, the cancel control section 64 judges that the second cancel condition is satisfied, and cancels the lane change of the moving body 10 from the first lane 72A to the second lane 72B. After this, the process shown in FIG. 4 ends.

In this way, according to the present embodiment, when the first cancel condition is satisfied in a state where the grip judging section 66 has judged that the grip of the occupant on the manipulator 74 is greater than or equal to the prescribed level, the cancel control section 64 performs control such as described below. Specifically, in such a case, the cancel control section 64 judges that the second cancel condition is satisfied if the distance L in the vehicle width direction between the moving body 10 and the lane marker 73 positioned between the first lane 72A and the second lane 72B is greater than or equal to the first distance threshold value TH1. Since the first cancel condition and the second cancel condition are satisfied, the cancel control section 64 cancels the lane change of the moving body 10 from the first lane 72A to the second lane 72B. On the other hand, when the first cancel condition is satisfied in a state where the grip judging section 66 has judged that the grip of the occupant on the manipulator 74 is less than the prescribed level, the cancel control section 64 performs control such as described below. Specifically, in such a case, the cancel control section 64 judges that the second cancel condition is satisfied if the distance L in the vehicle width direction between the moving body 10 and the lane marker 73 is greater than or equal to the second distance threshold value TH2, which is greater than the first distance threshold value TH1. Since the first cancel condition and the second cancel condition are satisfied, the cancel control section 64 cancels the lane change of the moving body 10 from the first lane 72A to the second lane 72B. In this way, according to the present embodiment, it is possible to provide the moving body control apparatus 12 that can accurately cancel the lane change.

[Modifications]

The following describes a moving body control apparatus, a moving body, and a moving body control method according to a modification of the present embodiment, using the drawings.

Figure 5:
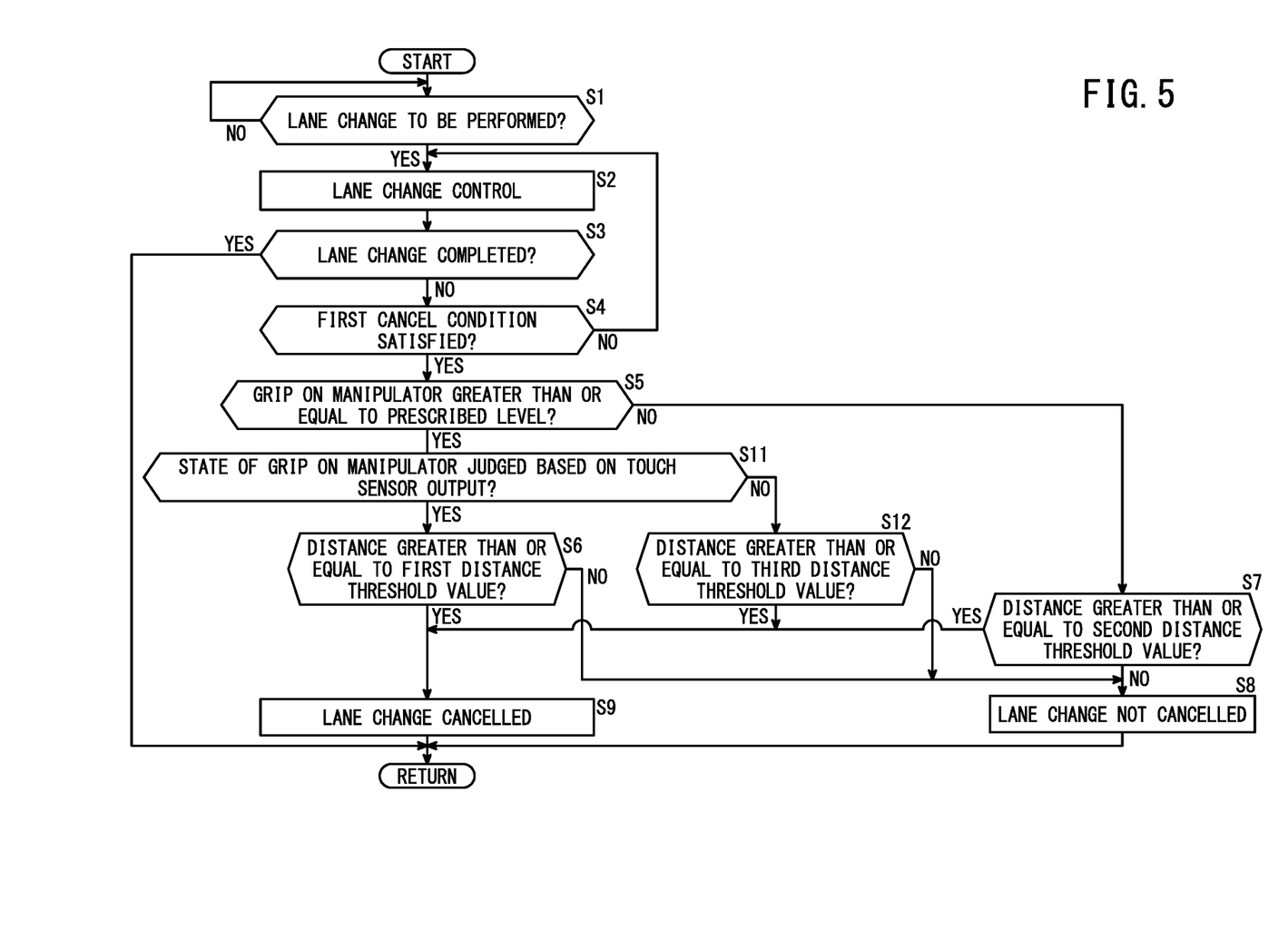
FIG. 5 is a flow chart showing an example of an operation of the moving body control apparatus according to a modification of an embodiment.

In the present modification, when the first cancel condition is satisfied in a state where it has been judged, based on the output of the touch sensor 42, that the grip of the occupant on the manipulator 74 is greater than or equal to the prescribed level, the cancel control section 64 can perform control such as described below. Specifically, in such a case, the cancel control section 64 judges that the second cancel condition is satisfied if the distance L in the vehicle width direction between the moving body 10 and the lane marker 73 is greater than or equal to the first distance threshold value TH1. Since the first cancel condition and the second cancel condition are satisfied, the cancel control section 64 can cancel the lane change of the moving body 10 from the first lane 72A to the second lane 72B. When the first cancel condition is satisfied in a state where the grip of the occupant on the manipulator 74 is not detected by the touch sensor 42 and it has been judged, based on the output of the torque sensor 18A, that the grip of the occupant on the manipulator 74 is greater than or equal to the prescribed level, the following occurs. Specifically, in such a case, the cancel control section 64 judges that the second cancel condition is satisfied if the distance L in the vehicle width direction between the moving body 10 and the lane marker 73 is greater than or equal to a third distance threshold value TH3, which is greater than the first distance threshold value TH1. Since the first cancel condition and the second cancel condition are satisfied, the cancel control section 64 can cancel the lane change of the moving body 10 from the first lane 72A to the second lane 72B. In this way, in the present modification, the distance threshold values are made different according to whether the state of the grip of the occupant on the manipulator 74 is judged based on the output of the touch sensor 42 or judged based on the output of the torque sensor 18A.

In the present modification the reason for making the distance threshold values different according to whether the state of the grip of the occupant on the manipulator 74 is judged based on the output of the touch sensor 42 or judged based on the output of the torque sensor 18A is as follows. Specifically, even when the manipulator 74 is being gripped, it is possible that a judgement would be made that the manipulator 74 is not being gripped, if torque is not being applied to the manipulator 74. Accordingly, when the first cancel condition is satisfied in a state where the state of the grip of the occupant on the manipulator 74 has been judged based on the output of the torque sensor 18A, the cancel control section 64 performs control such as described below. Specifically, in such a case, the cancel control section 64 can judge that the second cancel condition is satisfied and cancel the lane change of the moving body 10 from the first lane 72A to the second lane 72B if the distance L is greater than or equal to the third distance threshold value TH3, which is greater than the first distance threshold value TH1.

FIG. 5 is a flow chart showing the operation of the moving body control apparatus according to the present modification.

Steps S1 to S5 are the same as steps S1 to S5 described above using FIG. 4, and therefore descriptions thereof are omitted. If the grip of the occupant on the manipulator 74 is greater than or equal to the prescribed level (YES at step S5), the process moves to step S11. If the grip of the occupant on the manipulator 74 is less than the prescribed level (NO at step S5), the process moves to step S7.

At step S11, a judgment is made as to whether the grip of the occupant on the manipulator 74 was judged based on the output of the touch sensor 42. If the grip of the occupant on the manipulator 74 was judged based on the output of the touch sensor 42 (YES at step S11), the process moves to step S6. If the grip of the occupant on the manipulator 74 was judged based on the output of the torque sensor 18A (NO at step S11), the process moves to step S12.

At step S12, the cancel control section 64 judges whether the distance L in the vehicle width direction between the moving body 10 and the lane marker 73 is greater than or equal to the third distance threshold value TH3. If the distance L in the vehicle width direction between the moving body 10 and the lane marker 73 is greater than or equal to the third distance threshold value TH3 (YES at step S12), the process moves to step S9. If the distance L in the vehicle width direction between the moving body 10 and the lane marker 73 is less than the third distance threshold value TH3 (NO at step S12), the process moves to step S8.

Steps S6 to S9 are the same as steps S6 to S9 described above using FIG. 4, and therefore descriptions thereof are omitted. After this, the process shown in FIG. 5 ends.

Modified Embodiments

Preferred embodiments of the present invention are described above, but the present invention is not limited to the above-described embodiments, and various alterations can be adopted therein without departing from the scope of the present invention.

For example, in the present embodiment described above, an example is described of a case in which the state of the grip of the occupant on the manipulator 74 is judged based on the output of the touch sensor 42 or the output of the torque sensor 18A, but the present invention is not limited to this. For example, the state of the grip of the occupant on the manipulator 74 may be judged based on an image acquired by image capturing performed by the camera 44. When the first cancel condition is satisfied in a state where the state of the grip of the occupant on the manipulator 74 is judged based on the image acquired by the camera 44, the cancel control section 64 can perform control such as described below. Specifically, in such a case, the cancel control section 64 judges that the second cancel condition is satisfied if the distance L in the vehicle width direction between the moving body 10 and the lane marker 73 is greater than or equal to a fourth distance threshold value TH4, which is greater than the first distance threshold value TH1. Since the first cancel condition and the second cancel condition are satisfied, the cancel control section 64 can cancel the lane change of the moving body 10 from the first lane 72A to the second lane 72B.

The following is a summary of the embodiments described above.

A moving body control apparatus (12) comprises a vicinity information acquiring section (58) that acquires vicinity information of a moving body (10); a travel control section (60) that controls travel of the moving body based on the vicinity information; a lane change control section (62) that controls a lane change of the moving body; a cancel control section (64) that performs control to cancel the lane change when a first cancel condition and a second cancel condition for cancelling the lane change are satisfied; and a grip judging section (66) that judges a state of a grip of an occupant of the moving body on a manipulator (74) configured to steer the moving body, wherein, when the first cancel condition is satisfied in a state where it is judged that the grip of the occupant on the manipulator is greater than or equal to a prescribed level, if a distance (L) in a vehicle width direction between the moving body and a lane marker (73), which is positioned between a first lane (72A) in which the moving body is travelling and a second lane (72B) adjacent to the first lane, is greater than or equal to a first distance threshold value (TH1), the cancel control section causes the moving body control apparatus to judge that the second cancel condition is satisfied and to cancel the lane change of the moving body from the first lane to the second lane, and if the distance in the vehicle width direction between the moving body and the lane marker is less than the first distance threshold value, the cancel control section causes the moving body control apparatus to judge that the second cancel condition is not satisfied and to perform the lane change of the moving body from the first lane to the second lane, and when the first cancel condition is satisfied in a state where it is judged that the grip of the occupant on the manipulator is less than the prescribed level, if the distance in the vehicle width direction between the moving body and the lane marker is greater than or equal to a second distance threshold value (TH2), which is greater than the first distance threshold value, the cancel control section causes the moving body control apparatus to judge that the second cancel condition is satisfied and to cancel the lane change of the moving body from the first lane to the second lane, and if the distance in the vehicle width direction between the moving body and the lane marker is less than the second distance threshold value, the cancel control section causes the moving body control apparatus to judge that the second cancel condition is not satisfied and to perform the lane change of the moving body from the first lane to the second lane. According to such a configuration, it is possible to provide a moving body control apparatus that can relax the conditions under which the lane change of the moving body 10 can be cancelled.

When the first cancel condition is satisfied in a state where the distance in the vehicle width direction between the moving body and the lane marker is greater than or equal to the first distance threshold value and less than the second distance threshold value and the grip of the occupant on the manipulator is judged by the grip judging section to be greater than or equal to the prescribed level, the cancel control section may cancel the lane change of the moving body from the first lane to the second lane.

When the lane change is cancelled, the travel control section may control the travel of the moving body in a manner that the moving body travels along the center of the first lane.

The moving body may include a touch sensor (42) that detects a touch of the occupant on the manipulator and a torque sensor (18A) that detects torque applied to the manipulator; when the first cancel condition is satisfied in a state where it is judged, based on the output of the touch sensor, that the grip of the occupant on the manipulator is greater than or equal to the prescribed level, if the distance in the vehicle width direction between the moving body and the lane marker is greater than or equal to the first distance threshold value, the cancel control section may judge that the second cancel condition is satisfied and cancel the lane change of the moving body from the first lane to the second lane; and when the first cancel condition is satisfied in a state where the grip of the occupant on the manipulator is not detected by the touch sensor and the grip of the occupant on the manipulator is judged, based on output of the torque sensor, to be greater than or equal to the prescribed level, if the distance in the vehicle width direction between the moving body and the lane marker is greater than or equal to the third distance threshold value (TH3), which is greater than the first distance threshold value, the cancel control section may judge that the second cancel condition is satisfied and cancel the lane change of the moving body from the first lane to the second lane.

The first distance threshold value may be variable according to velocity of the moving body.

The second distance threshold value may be variable according to velocity of the moving body.

The first cancel condition may be satisfied when another moving body (70) travelling in the second lane is approaching.

The first distance threshold value may be 0.

The grip judging section may judge whether the manipulator is being gripped by the occupant; when the first cancel condition is satisfied in a state where it is judged that the manipulator is being gripped by the occupant, if the distance in the vehicle width direction between the moving body and the lane marker is greater than or equal to the first distance threshold value, the cancel control section may judge that the second cancel condition is satisfied and cancel the lane change of the moving body from the first lane to the second lane, and if the distance in the vehicle width direction between the moving body and the lane marker is less than the first distance threshold value, the cancel control section may judge that the second cancel condition is not satisfied and perform the lane change of the moving body from the first lane to the second lane; and when the first cancel condition is satisfied in a state where it is judged that the manipulator is not being gripped by the occupant, if the distance in the vehicle width direction between the moving body and the lane marker is greater than or equal to the second distance threshold value, the cancel control section may judge that the second cancel condition is satisfied and cancel the lane change of the moving body from the first lane to the second lane, and if the distance in the vehicle width direction between the moving body and the lane marker is less than the second distance threshold value, the cancel control section may judge that the second cancel condition is not satisfied and perform the lane change of the moving body from the first lane to the second lane.

A moving body (10) comprises the moving body control apparatus described above.

A moving body control method comprises a lane change control step (S2) of controlling a lane change of a moving body based on vicinity information of the moving body; a cancellation control step (S4, S6 to S9) of performing control to cancel the lane change when a first cancel condition and a second cancel condition for cancelling the lane change are satisfied; and a grip judging step (S5) of judging a state of a grip of an occupant of the moving body on a manipulator configured to steer the moving body, wherein, in the cancellation control step, when the first cancel condition is satisfied in a state where it is judged in the grip judging step that the grip of the occupant on the manipulator is greater than or equal to a prescribed level (S4, S5), if a distance in a vehicle width direction between the moving body and a lane marker, which is positioned between a first lane in which the moving body is travelling and a second lane adjacent to the first lane, is greater than or equal to a first distance threshold value, the second condition is judged to be satisfied and the lane change of the moving body from the first lane to the second lane is cancelled (S6, S9), and if the distance in the vehicle width direction between the moving body and the lane marker is less than the first distance threshold value, the second cancel condition is judged not to be satisfied and the lane change of the moving body from the first lane to the second lane is performed (S6, S8); and in the cancellation control step, when the first cancel condition is satisfied in a state where it is judged in the grip judging step that the grip of the occupant on the manipulator is less than the prescribed level (S4, S5), if the distance in the vehicle width direction between the moving body and the lane marker is greater than or equal to a second distance threshold value, which is greater than the first distance threshold value, the second condition is judged to be satisfied and the lane change of the moving body from the first lane to the second lane is cancelled (S7, S9), and if the distance in the vehicle width direction between the moving body and the lane marker is less than the second distance threshold value, the second cancel condition is judged not to be satisfied and the lane change of the moving body from the first lane to the second lane is performed (S7, S8).

What is claimed is:

1. A moving body control apparatus comprising one or more processors that execute computer-executable instructions stored in a memory, wherein
    the one or more processors execute the computer-executable instructions to cause the moving body control apparatus to:
    acquire vicinity information of a moving body;
    control travel of the moving body based on the vicinity information;
    control a lane change of the moving body;
    perform control to cancel the lane change when a first cancel condition and a second cancel condition for cancelling the lane change are satisfied; and
    judge a state of a grip of an occupant of the moving body on a manipulator configured to steer the moving body, and wherein
    when the first cancel condition is satisfied in a state where the grip of the occupant on the manipulator is judged to be greater than or equal to a prescribed level, if a distance in a vehicle width direction between the moving body and a lane marker, which is positioned between a first lane in which the moving body is travelling and a second lane adjacent to the first lane, is greater than or equal to a first distance threshold value, the one or more processors cause the moving body control apparatus to judge that the second cancel condition is satisfied and to cancel the lane change of the moving body from the first lane to the second lane, and if the distance in the vehicle width direction between the moving body and the lane marker is less than the first distance threshold value, the one or more processors cause the moving body control apparatus to judge that the second cancel condition is not satisfied and to perform the lane change of the moving body from the first lane to the second lane, and
    when the first cancel condition is satisfied in a state where the grip of the occupant on the manipulator is judged to be less than the prescribed level, if the distance in the vehicle width direction between the moving body and the lane marker is greater than or equal to a second distance threshold value, which is greater than the first distance threshold value, the one or more processors cause the moving body control apparatus to judge that the second cancel condition is satisfied and to cancel the lane change of the moving body from the first lane to the second lane, and if the distance in the vehicle width direction between the moving body and the lane marker is less than the second distance threshold value, the one or more processors cause the moving body control apparatus to judge that the second cancel condition is not satisfied and to perform the lane change of the moving body from the first lane to the second lane.

2. The moving body control apparatus according to claim 1, wherein
    when the first cancel condition is satisfied in a state where the distance in the vehicle width direction between the moving body and the lane marker is greater than or equal to the first distance threshold value and less than the second distance threshold value and the grip of the occupant on the manipulator is judged to be greater than or equal to the prescribed level, the one or more processors cause the moving body control apparatus to cancel the lane change of the moving body from the first lane to the second lane.

3. The moving body control apparatus according to claim 1, wherein when the lane change is cancelled, the one or more processors cause the moving body control apparatus to control travel of the moving body in a manner that the moving body travels along a center of the first lane.

4. The moving body control apparatus according to claim 1, wherein
the moving body includes a touch sensor configured to detect a touch of the occupant on the manipulator, and a torque sensor configured to detect torque applied to the manipulator,
when the first cancel condition is satisfied in a state where the grip of the occupant on the manipulator is judged to be greater than or equal to the prescribed level based on an output of the touch sensor, if the distance in the vehicle width direction between the moving body and the lane marker is greater than or equal to the first distance threshold value, the one or more processors cause the moving body control apparatus to judge that the second cancel condition is satisfied and to cancel the lane change of the moving body from the first lane to the second lane, and
when the first cancel condition is satisfied in a state where the grip of the occupant on the manipulator is not detected by the touch sensor and the grip of the occupant on the manipulator is judged to be greater than or equal to the prescribed level based on an output of the torque sensor, if the distance in the vehicle width direction between the moving body and the lane marker is greater than or equal to a third distance threshold value, which is greater than the first distance threshold value, the one or more processors cause the moving body control apparatus to judge that the second cancel condition is satisfied and to cancel the lane change of the moving body from the first lane to the second lane.

5. The moving body control apparatus according to claim 1, wherein
the first distance threshold value is variable according to velocity of the moving body.

6. The moving body control apparatus according to claim 1, wherein
the second distance threshold value is variable according to velocity of the moving body.

7. The moving body control apparatus according to claim 1, wherein
the first cancel condition is satisfied when another moving body travelling in the second lane is approaching.

8. The moving body control apparatus according to claim 1, wherein
the first distance threshold value is 0.

9. The moving body control apparatus according to claim 1, wherein
the one or more processors cause the moving body control apparatus to judge whether the manipulator is being gripped by the occupant,
when the first cancel condition is satisfied in a state where it is judged that the manipulator is being gripped by the occupant, if the distance in the vehicle width direction between the moving body and the lane marker is greater than or equal to the first distance threshold value, the one or more processors cause the moving body control apparatus to judge that the second cancel condition is satisfied and to cancel the lane change of the moving body from the first lane to the second lane, and if the distance in the vehicle width direction between the moving body and the lane marker is less than the first distance threshold value, the one or more processors cause the moving body control apparatus to judge that the second cancel condition is not satisfied and to perform the lane change of the moving body from the first lane to the second lane, and
when the first cancel condition is satisfied in a state where it is judged that the manipulator is not being gripped by the occupant, if the distance in the vehicle width direction between the moving body and the lane marker is greater than or equal to the second distance threshold value, the one or more processors cause the moving body control apparatus to judge that the second cancel condition is satisfied and to cancel the lane change of the moving body from the first lane to the second lane, and if the distance in the vehicle width direction between the moving body and the lane marker is less than the second distance threshold value, the one or more processors cause the moving body control apparatus to judge that the second cancel condition is not satisfied and to perform the lane change of the moving body from the first lane to the second lane.

10. A moving body comprising a moving body control apparatus, the moving body control apparatus comprising one or more processors that execute computer-executable instructions stored in a memory, wherein
the one or more processors execute the computer-executable instructions to cause the moving body control apparatus to:
acquire vicinity information of a moving body;
control travel of the moving body based on the vicinity information;
control a lane change of the moving body;
perform control to cancel the lane change when a first cancel condition and a second cancel condition for cancelling the lane change are satisfied; and
judge a state of a grip of an occupant of the moving body on a manipulator configured to steer the moving body, and wherein
when the first cancel condition is satisfied in a state where the grip of the occupant on the manipulator is judged to be greater than or equal to a prescribed level, if a distance in a vehicle width direction between the moving body and a lane marker, which is positioned between a first lane in which the moving body is travelling and a second lane adjacent to the first lane, is greater than or equal to a first distance threshold value, the one or more processors cause the moving body control apparatus to judge that the second cancel condition is satisfied and to cancel the lane change of the moving body from the first lane to the second lane, and if the distance in the vehicle width direction between the moving body and the lane marker is less than the first distance threshold value, the one or more processors cause the moving body control apparatus to judge that the second cancel condition is not satisfied and to perform the lane change of the moving body from the first lane to the second lane, and
when the first cancel condition is satisfied in a state where the grip of the occupant on the manipulator is judged to be less than the prescribed level, if the distance in the vehicle width direction between the moving body and the lane marker is greater than or equal to a second distance threshold value, which is greater than the first distance threshold value, the one or more processors cause the moving body control apparatus to judge that the second cancel condition is satisfied and to cancel the lane change of the moving body from the first lane to the second lane, and if the distance in the vehicle width direction between the moving body and the lane marker is less than the second distance threshold value, the one or more processors cause the moving body control apparatus to judge that the second cancel condition is not satisfied and to perform the lane change of the moving body from the first lane to the second lane.

11. A moving body control method comprising:

controlling a lane change of a moving body based on vicinity information of the moving body;

performing control to cancel the lane change when a first cancel condition and a second cancel condition for cancelling the lane change are satisfied; and judging a state of a grip of an occupant of the moving body on a manipulator configured to steer the moving body, wherein in the controlling of cancellation, when the first cancel condition is satisfied in a state where it is judged, in the judging of the grip, that the grip of the occupant on the manipulator is greater than or equal to a prescribed level, if a distance in a vehicle width direction between the moving body and a lane marker, which is positioned between a first lane in which the moving body is travelling and a second lane adjacent to the first lane, is greater than or equal to a first distance threshold value, the second condition is judged to be satisfied and the lane change of the moving body from the first lane to the second lane is cancelled, and if the distance in the vehicle width direction between the moving body and the lane marker is less than the first distance threshold value, the second cancel condition is judged not to be satisfied and the lane change of the moving body from the first lane to the second lane is performed, and in the controlling of cancellation, when the first cancel condition is satisfied in a state where it is judged, in the judging of the grip, that the grip of the occupant on the manipulator is less than the prescribed level, if the distance in the vehicle width direction between the moving body and the lane marker is greater than or equal to a second distance threshold value, which is greater than the first distance threshold value, the second condition is judged to be satisfied and the lane change of the moving body from the first lane to the second lane is cancelled, and if the distance in the vehicle width direction between the moving body and the lane marker is less than the second distance threshold value, the second cancel condition is judged not to be satisfied and the lane change of the moving body from the first lane to the second lane is performed.

\* \* \* \* \*